US008869456B2

(12) United States Patent
Matsuura

(10) Patent No.: US 8,869,456 B2
(45) Date of Patent: Oct. 28, 2014

(54) GLASS RUN AND METHOD OF ASSEMBLING DOOR GLASS ON GLASS RUN

(71) Applicant: Nishikawa Rubber Co., Ltd., Hiroshima (JP)

(72) Inventor: Toshifumi Matsuura, Hatsukaichi (JP)

(73) Assignee: Nishikawa Rubber Co., Ltd., Hiroshima-Shi, Hiroshima-Ken (JP)

( * ) Notice: Subject to any disclaimer, the term of this patent is extended or adjusted under 35 U.S.C. 154(b) by 0 days.

(21) Appl. No.: 13/911,335

(22) Filed: Jun. 6, 2013

(65) Prior Publication Data

US 2013/0340348 A1    Dec. 26, 2013

(30) Foreign Application Priority Data

Jun. 20, 2012   (JP) ................ 2012-138971

(51) Int. Cl.
*E06B 7/22* (2006.01)
*B60J 10/00* (2006.01)
*B60J 10/04* (2006.01)

(52) U.S. Cl.
CPC ............... *E06B 7/22* (2013.01); *B60J 10/0054* (2013.01); *B60J 10/042* (2013.01)
USPC ....................... 49/490.1; 49/489.1

(58) Field of Classification Search
USPC ........ 49/440, 441, 475.1, 489.1, 490.1, 495.1
See application file for complete search history.

(56) References Cited

U.S. PATENT DOCUMENTS

| | | | | |
|---|---|---|---|---|
| 4,809,463 A * | 3/1989 | Schroder et al. | ................. | 49/377 |
| 4,864,774 A * | 9/1989 | Onishi et al. | .................... | 49/440 |
| 5,319,883 A * | 6/1994 | Gueneau et al. | ............. | 49/489.1 |
| 6,301,834 B1 * | 10/2001 | Tyves | ............................... | 49/441 |
| 6,435,597 B1 * | 8/2002 | Anders et al. | ............ | 296/107.07 |
| 6,493,992 B2 * | 12/2002 | Goto | ................................... | 49/441 |
| 7,237,359 B2 * | 7/2007 | Aritake et al. | ................... | 49/441 |
| 7,487,615 B2 * | 2/2009 | Watanabe et al. | ............... | 49/441 |
| 7,571,569 B2 * | 8/2009 | Hiramatsu et al. | ........... | 49/479.1 |
| 8,079,180 B2 * | 12/2011 | Titz | ............................... | 49/490.1 |
| 8,104,229 B2 * | 1/2012 | Minami et al. | ............... | 49/479.1 |
| 8,196,354 B2 * | 6/2012 | Ota | ................................... | 49/441 |
| 8,567,127 B2 * | 10/2013 | Takase et al. | ................... | 49/440 |
| 2004/0134132 A1 * | 7/2004 | Baumann | ........................ | 49/441 |
| 2005/0120633 A1 * | 6/2005 | Takase et al. | ................... | 49/441 |
| 2007/0089371 A1 * | 4/2007 | Krause | ............................... | 49/441 |
| 2007/0251152 A1 * | 11/2007 | Takase et al. | ................... | 49/441 |
| 2007/0271853 A1 * | 11/2007 | Yatsuda et al. | ............... | 49/489.1 |
| 2008/0246304 A1 * | 10/2008 | Huttebraucker et al. | .. | 296/146.9 |
| 2009/0108625 A1 * | 4/2009 | Minami et al. | ............. | 296/146.2 |
| 2013/0174492 A1 * | 7/2013 | Laycoe et al. | ............... | 49/475.1 |

FOREIGN PATENT DOCUMENTS

JP    62-088609 A    4/1987

* cited by examiner

*Primary Examiner* — Katherine Mitchell
*Assistant Examiner* — Justin Rephann
(74) *Attorney, Agent, or Firm* — Lucas & Mercanti LLP; Robert P. Michal

(57) ABSTRACT

A glass run includes a forked outer lip, wherein: one interval between a base root and an intermediate part of the inner lip is swelled and curved toward an inner-cabin side wall side and another interval between the intermediate part and a top end is swelled and curved toward an outer-cabin side wall side; a displacement point is on the connecting wall side compared with a top end of the outer-attaching lip of the outer lip; and the door glass abuts the inner lip and slidably moves toward the top end side and an outer-cabin side surface of the door glass abuts the outer-attaching lip and the inner-attaching lip while an inner-cabin side surface of the door glass abuts the inner lip.

18 Claims, 10 Drawing Sheets

GLASS RUN AND METHOD OF ASSEMBLING DOOR GLASS ON GLASS RUN

This application claims the benefit under 35 USC 119 of JP Patent Application JP 2012-138971 filed Jun. 20, 2012, the entire disclosure of which is incorporated herein by reference.

BACKGROUND OF THE INVENTION

The present invention relates to a glass run and a method of assembling a door glass on said glass run which is fittable along a frame of an automobile door for guiding the door glass lifting or lowering.

As shown in FIG. 8, an ordinary glass run 100 has been fit on a door sash (frame) 400 of a front door 200 and a rear door 300 of an automobile for guiding a door glass 9 lifting or lowering.

FIG. 9 shows the glass run 100 mounted on the front door 200 side. The glass run 100 comprises: a front side vertical edge part 11 and a rear side vertical edge part 12, which extend upward from an inner part of a door panel 200a of the front door 200; and a cross edge part 13 which connects upper ends of the two vertical edge parts 11, 12. The two vertical edge parts 11, 12 and the cross edge part 13 are generally formed by extrusion molding and connected with each other via two molded parts 14, 15.

The glass run 100 shown in FIGS. 10 and 11 has been well known, of which outer lip 6 is forked and which is applicable to the rear side vertical edge part 12.

The glass run 100 comprises a body 1 having a substantially U-shape in cross-section and has the ditch part 7 formed therein. The body 1 comprises two side walls, an inner-cabin side wall 2 and an outer-cabin side wall 3, and a connecting wall 4 which connects the inner-cabin side wall 2 and the outer-cabin side wall 3. The inner-cabin side wall 2 has an inner lip 5 formed on an inner surface as an outer-cabin side surface thereof, which extends toward the connecting wall 4 side. The outer-cabin side wall 3 has the forked outer lip 6 formed on an inner surface as an inner-cabin side surface thereof, which extends toward the inner-cabin side.

The outer lip 6 comprises an inner-attaching lip 6X and an outer-attaching lip 6Y. The inner-attaching lip 6X extends from the inner surface of an end of the outer-cabin side wall 3 toward the connecting wall 4 side and faces the inner lip 5 for fastening the door glass 9 in cooperation with the inner lip 5. The outer-attaching lip 6Y extends substantially perpendicularly to the inner-attaching lip 6X.

After the glass run 100 is assembled on the door sash 400, the door glass 9 is assembled into the ditch part 7 of the glass run 100 in the following manner. As the door glass 9 is guided into the ditch 7 of the glass run 100, abuts the inner-attaching lip 6X and is further guided into the ditch 7 to approach the connecting wall 4, the inner-attaching lip 6X turns in such a manner as to approach the outer-cabin side wall 3 around a notch 8 formed on the connecting wall 4 side of a base root of the inner-attaching lip 6X to be thin while the outer-attaching lip 6Y also turns in such a manner as to approach the door glass 9 side following the turn of the inner-attaching lip 6X. When the door glass 9 is fully guided into the ditch 7 of the glass run 100, as shown in FIG. 10, the outer-attaching lip 6Y as well as the inner-attaching lip 6X is slidably brought into contact with the outer-cabin side surface of the door glass 9. Resultant double sealing structure that the outer-attaching lip 6Y as well as the inner-attaching lip 6X is slidably brought into contact with the door glass 9 improves noise insulation function and water proof function. Such a structure is disclosed, for example, in the Japanese unexamined Patent Publication No. S62-88609.

When the outer-attaching lip 6Y is shorter than the inner-attaching lip 6X in cross section, there has remained a problem that, in case positional relation between the door glass 9 and the outer-attaching lip 6Y varies, a space generates between the door glass 9 and the outer-attaching lip 6Y even though the outer-attaching lip 6Y turns following the turn of the inner-attaching lip 6X when the door glass 9 is guided into the glass run 100. Also, even in case the outer-attaching lip 6Y abuts the door glass 9, when the load by the outer-attaching lip 6Y on the door glass 9 is insufficient, an excellent noise insulation function and water proof function are not performed.

On the other hand, when the outer-attaching lip 6Y is longer than the inner-attaching lip 6X in cross section, sufficient sealing property is secured. But as the door glass 9 is guided into the ditch 7 from a position 700 as shown in FIG. 11, the top end 6a of the outer-attaching lip 6Y may be drawn toward the connecting wall 4 side while guiding the door glass 9 as shown in FIG. 12 and assembling property of the door glass 9 may be degraded. Especially, in case the outer-attaching lip 6Y of the outer lip 6 fully touches the inner lip 5 even before the door glass 9 is guided into the ditch 7 of the glass run 100 as shown in FIG. 11, the door glass 9 is hardly guided (inserted) into the ditch 7 of the glass run 100.

As a result, on a position below a belt line 80 (FIG. 9) relative to the door 200 of the automobile, the top end of the outer-attaching lip 6Y has to be partially (range 1200 in FIG. 11) cut off for inserting (guiding) the door glass 9 into the glass run 100. Such a structure degrades productivity, heightens cost and degrades assembly workability of the door glass 9. On the other hand, in case the top end side of the outer-attaching lip 6Y is not partially cut off the door glass 9 has to be inserted by a jig exclusively for inserting the door glasses 9 in an assembly line. Such a structure has remained a problem of taking an extra manufacturing time.

In addition, the inner lip 5 extends toward the outer-cabin side wall 3 side from the inner-cabin side wall 2 side while being swelled and curved. Accordingly, as shown in FIG. 11, when the door glass 9 is guided into the ditch 7 of the glass run 100 from a position 800, a base root of the inner lip 5 catches the door glass 9 and hampers smooth movement of the door glass 9.

According to the glass run 100 shown in FIGS. 10 to 12, since the notch 8 as a center of the turn of the inner-attaching lip 6X is formed on the connecting wall 4 side compared with the end on the outer-cabin side part of the door sash 400, which is on inner-cabin side of the outer-cabin side wall 3, when the door glass 9 is guided into the ditch 7, distance between the notch 8 and the door glass 9 guided into the ditch 7 of the glass run 100 is shortened. Accordingly, bending amount of the inner-attaching lip 6X can not be large, the outer-attaching lip 6Y can not follow the turn of the inner-attaching lip 6X and the load of the outer-attaching lip 6Y on the door glass 9 is small.

Therefore, an object of the present invention is to provide a glass run excellent in noise insulation function and water proof function by preventing the outer lip from being drawn while guiding the door glass and improving the assembling property of the door glass.

SUMMARY OF THE INVENTION

In order to achieve the above-mentioned object, according to one aspect of the invention, a glass run (20) is provided for guiding a door glass (9) lifting or lowering in a ditch (27), which is fittable along a frame (400) having a substantially U-shape in cross section of an automobile door (200), the glass run comprising: a body (21) having a substantially U-shape in cross-section including an inner-cabin side wall (22), an outer-cabin side wall (23) and a connecting wall (24) which connects the side walls (22,23); an inner lip (25) which is extending toward said connecting wall (24) side from an outer-cabin side surface of said inner-cabin side wall (22) and slidably brought into contact with said door glass (9); and an outer lip (26) which is extending toward an inner-cabin side from an inner side surface of an end position (23a) of said outer-cabin side wall (23) and slidably brought into contact with said door glass (9), the outer lip (26) being forked into an inner-attaching lip (26X) which extends toward said connecting wall (24) side from an inner-cabin side surface of the end position (23a) of said outer-cabin side wall (23) and faces said inner lip (25) and an outer-attaching lip (26Y) which is substantially perpendicular to a direction in which the inner-attaching lip (26X) extends from a base root (26d) of the inner-attaching lip (26X) and extending toward an opposite side to said connecting wall (24) side; wherein:

said inner lip (25) is substantially S shaped in cross section, of which one interval between a base root (25b) and an intermediate part (25c) is swelled and curved toward said inner-cabin side wall (22) side and another interval between the intermediate part (25c) and a top end (25a) of said inner lip (25) is swelled and curved toward said outer-cabin side wall (23) side; and before said door glass (9) is guided into said ditch (27), a displacement point (70) on a surface on an opposite side to said connecting wall (24) side of said inner lip (25), on which a direction of a curve of said inner lip (25) changes, is on said connecting wall (24) side compared with a top end (26a) of the outer-attaching lip (26Y) of said outer lip (26).

In addition, according to an aspect of the invention, a glass run (20) is provided, wherein: a movement distance (90) from an imaginary parallel line (600) on the top end (26a) of the outer-attaching lip (26Y), the imaginary parallel line (600) being parallel with a surface of said door glass (9), to a position on which said imaginary parallel line (600) moved in parallel toward an inner-cabin side intersects said displacement point (70) is not less than a quarter of thickness (500) of said door glass (9).

In addition, according to an aspect of the invention, a glass run (20) is provided for guiding a door glass (9) lifting or lowering in a ditch (27), which is fittable along a frame (400) having a substantially U-shape in cross section of an automobile door (200), the glass run comprising: a body (21) having a substantially U-shape in cross-section including an inner-cabin side wall (22), an outer-cabin side wall (23) and a connecting wall (24) which connects the side walls (22,23); an inner lip (25) which is extending toward said connecting wall (24) side from an outer-cabin side surface of said inner-cabin side wall (22) and slidably brought into contact with said door glass (9); and an outer lip (26) which is extending toward an inner-cabin side from an inner side surface of an end position (23a) of said outer-cabin side wall (23) and slidably brought into contact with said door glass (9), the outer lip (26) being forked into an inner-attaching lip (26X) which extends toward said connecting wall (24) side from an inner-cabin side surface of the end position (23a) of said outer-cabin side wall (23) and faces said inner lip (25) and an outer-attaching lip (26Y) which is substantially perpendicular to a direction in which the inner-attaching lip (26X) extends from a base root (26d) of the inner-attaching lip (26X) and extending toward an opposite side to said connecting wall (24) side; wherein:

said inner lip (25) is substantially S shaped in cross section, of which one interval between a base root (25b) and an intermediate part (25c) is swelled and curved toward said inner-cabin side wall (22) side and another interval between the intermediate part (25c) and a top end (25a) of said inner lip (25) is swelled and curved toward said outer-cabin side wall (23) side; and while inserting said door glass (9) into a ditch (27) for assembling said door glass (9), as an end surface (9a) of said door glass (9) is slidably moved toward the top end (25a) side from the base root (25b) of said inner lip (25) and just before said door glass (9) abuts the outer-attaching lip (26Y) of said outer lip (26), a displacement point (70) on a surface on an opposite side to said connecting wall (24) side of said inner lip (25), on which a direction of a curve of said inner lip (25) changes, is on said connecting wall (24) side compared with a top end (26a) of the outer-attaching lip (26Y) of said outer lip (26).

Even in the above-mentioned working state, a movement distance (90) from an imaginary parallel line (600) on the top end (26a) of the outer-attaching lip (26Y), the imaginary parallel line (600) being parallel with a surface of said door glass (9), to a position on which said imaginary parallel line (600) moved in parallel toward a room side intersects said displacement point (70) is not less than a quarter of thickness (500) of said door glass (9) in the same manner.

In addition, according to an aspect of the invention, a glass run (20) is provided, wherein: a slidable material (30) is provided on a surface on an opposite side to said connecting wall (24) side of the base root (25b) of said inner lip (25).

In addition, according to an aspect of the invention, a glass run (20) is provided, wherein: a folding point (60) is formed by thinning thickness (32) of said connecting wall (24) side of the base root (26d) of said inner-attaching lip (26X) or by forming a notch (28) from an inner-cabin side for turning said inner-attaching lip (26X) toward said connecting wall (24) side;

thickness (31) of the base root (26d) of said inner-attaching lip (26X) is thicker than the thickness (32) on said folding point (60) and thickness (34) of the base root (26b) of said outer-attaching lip (26Y) is thinner than thickness (33) of the top end (26a) of the outer-attaching lip (26Y); and when said door glass (9) is guided into said ditch (27) and slidably brought into contact with said inner-attaching lip (26X), the inner-attaching lip (26X) turns toward said connecting wall (24) side around said folding point (60), said outer-attaching lip (26Y) approaches said door glass (9) side and is slidably brought into contact with the door glass (9) following movement of said inner-attaching lip (26X), and the top end (26a) of said outer-attaching lip (26Y) bends and moves toward an opposite side to said connecting wall (24) side along said door glass (9).

In addition, according to an aspect of the invention, a method of assembling a door glass (9) on a glass run (20) is provided for guiding a door glass (9) lifting or lowering in a ditch (27), which is fittable along a frame (400) having a substantially U-shape in cross section of an automobile door (200), the glass run comprising: a body (21) having a substantially U-shape in cross-section including an inner-cabin side wall (22), an outer-cabin side wall (23) and a connecting wall (24) which connects the side walls (22,23); an inner lip (25) which is extending toward said connecting wall (24) side from an outer-cabin side surface of said inner-cabin side wall (22) and slidably brought into contact with said door glass (9);

and an outer lip (26) which is extending toward an inner-cabin side from an inner side surface of an end position (23a) of said outer-cabin side wall (23) and slidably brought into contact with said door glass (9), the outer lip (26) being forked into an inner-attaching lip (26X) which extends toward said connecting wall (24) side from an inner-cabin side surface of the end position (23a) of said outer-cabin side wall (23) and faces said inner lip (25) and an outer-attaching lip (26Y) which is substantially perpendicular to a direction in which the inner-attaching lip (26X) extends from a base root (26d) of the inner-attaching lip (26X) and extending toward an opposite side to said connecting wall (24) side in which said inner lip (25) is substantially S shaped in cross section, of which one interval between a base root (25b) and an intermediate part (25c) is swelled and curved toward said inner-cabin side wall (22) side and another interval between the intermediate part (25c) and a top end (25a) of said inner lip (25) is swelled and curved toward said outer-cabin side wall (23) side;

a displacement point (70) on a surface on an opposite side to said connecting wall (24) side of said inner lip (25), on which a direction of a curve of said inner lip (25) changes, is on said connecting wall (24) side compared with a top end (26a) of the outer-attaching lip (26Y) of said outer lip (26); wherein said door glass (9) is inserted into the ditch (27) of the glass run by abutting an end surface (9a) of said door glass (9) on a base root (25b) of said inner lip (25) first, abutting an outer-cabin side surface of said door glass (9) on an inner-cabin side surface of the inner-attaching lip (26X) of said outer lip (26) via an inner-cabin side surface of the outer-attaching lip (26Y) of said outer lip (26) and abutting an inner-cabin side surface of said door glass (9) on said inner lip (25) while slidably moving said door glass (9) toward the top end (25a) side from the base root (25b) of said inner lip (25) for holding said door glass (9).

Symbols in parentheses show constituents or items corresponding to the drawings.

According to the glass run and the method of assembling the door glass on the glass run of the present invention, the inner lip is substantially S shaped in cross section and the displacement point on the surface on the opposite side to the connecting wall side of the inner lip, on which the direction of the curve of the substantially S shape in cross section changes, is on the connecting wall side compared with the top end of the outer-attaching lip of the outer lip. Accordingly, the outer-cabin side surface of the door glass abuts the inner-cabin side surface of the top end of the outer-attaching lip without fail by abutting the end surface of the door glass on the base root of the inner lip and slidably moving the door glass on the inner lip toward the top end side. Such a structure prevents the top end of the outer-attaching lip of the outer lip from being drawn toward the connecting wall side as in the prior art (FIG. 12).

As a result, the glass run which is excellent in noise insulation function and water proof function is provided. According to the structure, even the outer-attaching lip longer in length in cross section is not drawn toward the connecting wall side. Accordingly, sufficient sealing property can be secured by extending length of the outer-attaching lip longer than length of the inner-attaching lip, for example.

In addition, since the inner lip is substantially S shaped in cross section, the door glass slidably moves on the inner lip smoothly. Accordingly, insertion property of the door glass relative to the glass run is improved and the door glass is prevented from being caught by a base root of the inner lip.

Accordingly, it is not necessary to partially cut off the top end side of the outer-attaching lip below the position of the belt line as in the prior art, thereby improving the productivity. Even in case the top end side of the outer-attaching lip is not partially cut off, it is not necessary to use a jig exclusively for inserting the door glasses in an assembly line. Such a structure does not take an extra manufacturing time, thereby improving assembly workability.

Also, when inserting the door glass into the ditch of the glass run, the door glass abuts the inner-cabin side surface of the outer-attaching lip of the outer lip substantially at a right angle. More specifically, the end surface of the door glass gradually approaches and abuts the outer-attaching lip of the outer lip by slidably moving on the interval between the base root and the intermediate part of the inner lip swelled and curved toward the inner-cabin side wall side. In other words, the door glass abuts the inner-cabin side surface of the outer-attaching lip of the outer lip from an obtuse direction compared with an ordinary inner lip which as a whole is swelled and curved toward the outer-cabin side wall side from the inner-cabin side wall in cross section. Such a structure further prevents the top end of the outer-attaching lip of the outer lip from being drawn toward the connecting wall side.

The interval between the intermediate part and the top end of the inner lip is swelled and curved toward the outer-cabin side wall side in cross section, which is opposite to the interval between the base root and the intermediate part of the inner lip in curving direction. Accordingly, the door glass inserted in the ditch of the glass run is subjected to greater reaction force by elastic deformation of the interval between the intermediate part and the top end of the inner lip compared with the ordinary inner lip which as a whole is swelled and curved toward the outer-cabin side wall side from the inner-cabin side wall in cross section.

As a result, the door glass is held between the inner lip and the outer lip more securely and stably compared with the prior art.

In addition, according to the present invention, the slidable material is provided on the surface on the opposite side to the connecting wall side of the base root of the inner lip. Such a structure further smoothens the slidable movement of the door glass.

In addition, according to the present invention, the folding point is formed by thinning thickness of the connecting wall side of the base root of the inner-attaching lip of the outer lip or by forming the notch from the inner-cabin side for turning the inner-attaching lip toward the connecting wall side; the thickness of the base root of the inner-attaching lip is thicker than the thickness on the folding point and the thickness of the base root of the outer-attaching lip is thinner than the thickness of the top end of the outer-attaching lip; and when the door glass is guided into the ditch and slidably brought into contact with the inner-attaching lip, the inner-attaching lip turns toward the connecting wall side around the folding point, the outer-attaching lip approaches the door glass side and is slidably brought into contact with the door glass following movement of the inner-attaching lip, and the top end of the outer-attaching lip bends and moves toward the opposite side to the connecting wall side along the door glass. Accordingly on the outer lip side, the outer-attaching lip is slidably brought into contact with the door glass guided into the ditch of the glass run with sufficient load in addition to the inner-attaching lip. As a result, excellent noise insulation function and water proof function is achieved.

DESCRIPTION OF PREFERRED EMBODIMENT

Figure 1:
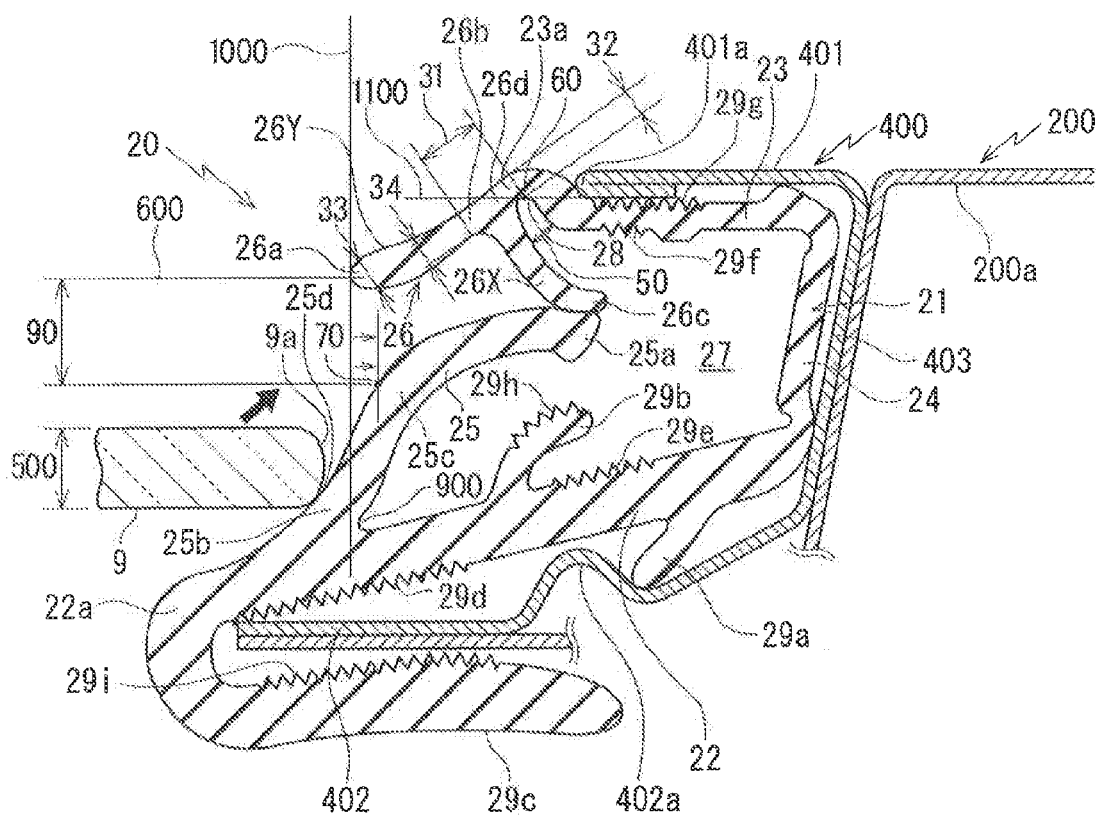
FIG. 1 is a I-I line enlarged cross section of FIG. 9, showing a state that a door glass is guided into a glass run according to an embodiment of the present invention.
Figure 2:
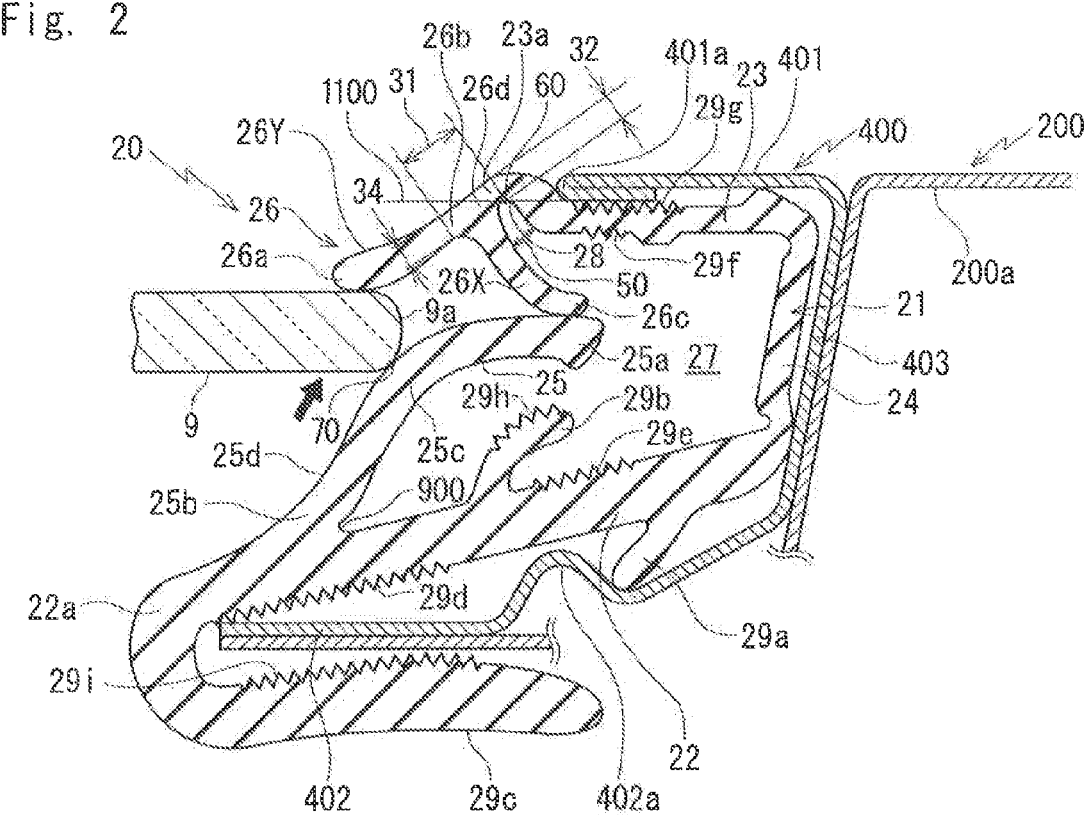
FIG. 2 is a I-I line enlarged cross section of FIG. 9, showing a state that the door glass of FIG. 1 is further guided into the glass run.
Figure 3:
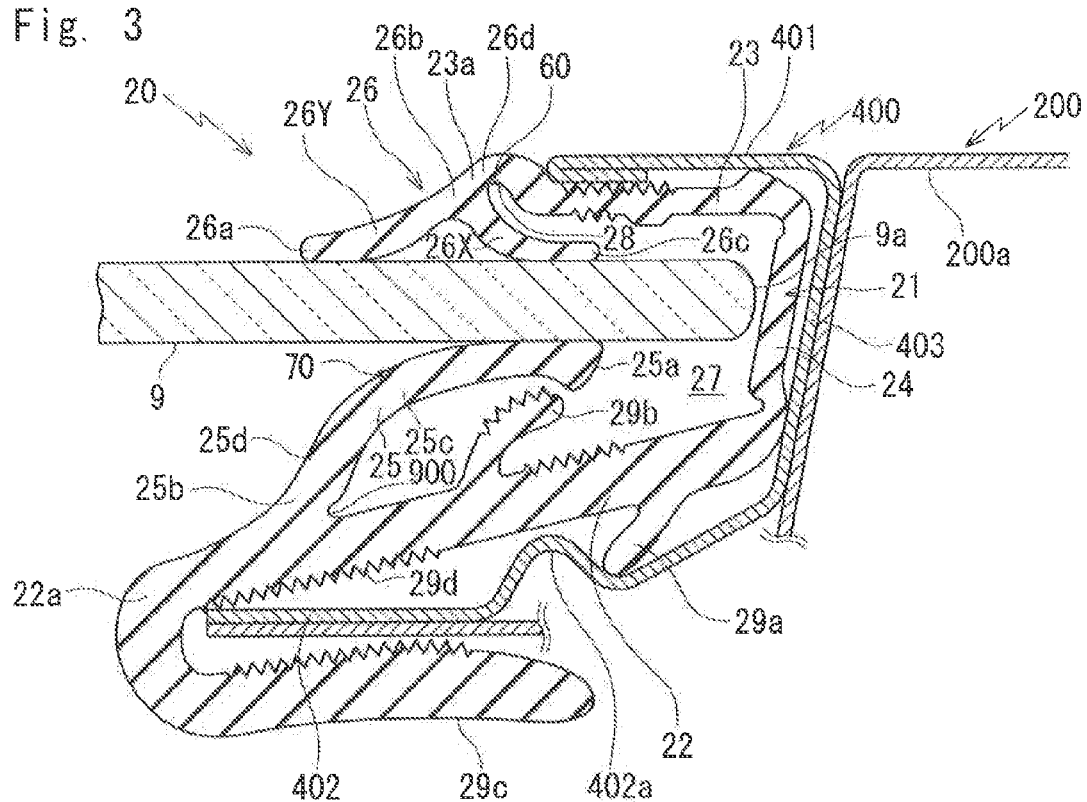
FIG. 3 is a I-I line enlarged cross section of FIG. 9, showing a state after the door glass is guided into the glass run of FIG. 1.

Referring to FIG. 1 to FIG. 3, a glass run 20 according to embodiments of the present invention will be described.

Figure 9:
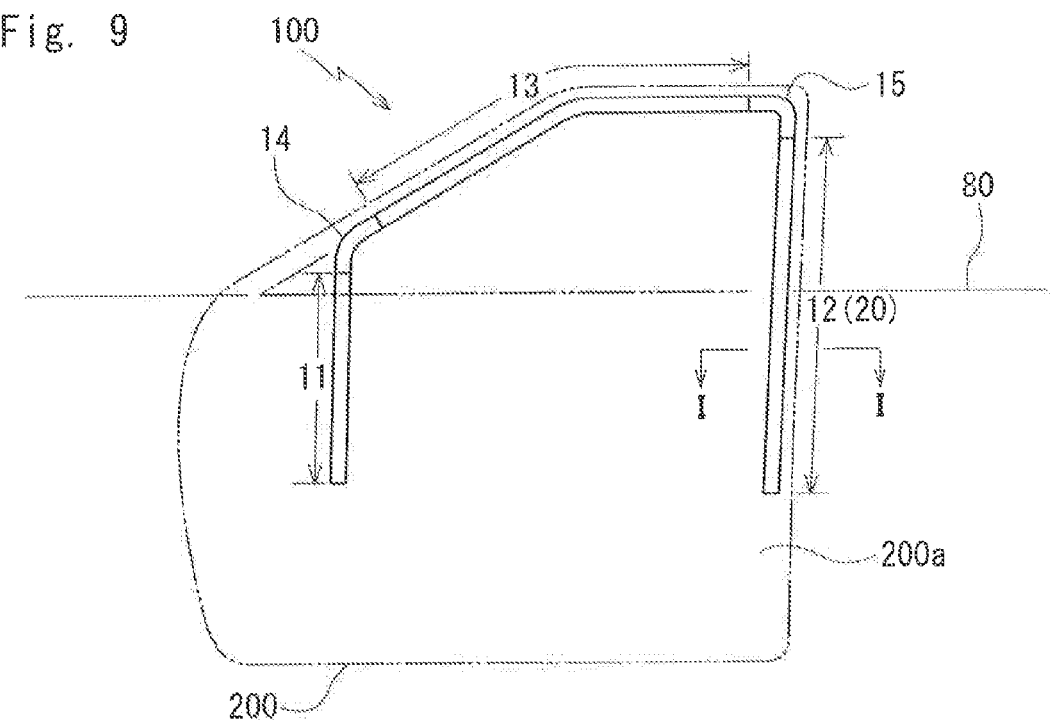
FIG. 9 is a lateral view of a glass run mounted on a front door of FIG. 8.

FIG. 1 and FIG. 2 are I-I line enlarged cross sections of FIG. 9, showing states that a door glass 9 is gradually guided into the glass run 20 according to an embodiment of the present invention at the time of assembly. FIG. 3 shows a state that the door glass 9 is fully guided into the glass run. When constituents or items correspond to those in prior arts, the same symbols are used.

The glass run 20 of the present invention is fittable along a door sash (frame) 400 mounted on a door panel 200a of a press door type front door 200 (or a rear door 300 in the same manner) by spot welding for guiding the door glass 9 lifting or lowering. The glass run 20 is, in case of a glass run 100 of a prior art (FIG. 9), applied on a rear side vertical edge part 12 which is extending upward on an inner part of the door panel 200a of the front door 200 and is positioned vertically crossing over a position at least on a belt line 80. The glass run 20 is generally formed by extrusion molding.

As shown in FIG. 1, the door sash 400 has a rough U shape in cross section and comprises an outer-cabin side part 401, an inner-cabin side part 402 and a connecting part 403 connecting the side parts. The inner-cabin side part 402 has a protrusion 402a protruding toward the outer-cabin side.

The glass run 20 comprises a body 21 having a substantially U-shape in cross-section, which forms a ditch 27 for guiding a door glass 9 lifting or lowering therein. The body 21 includes two side walls of an inner-cabin side wall 22, an outer-cabin side wall 23 and a connecting wall 24 which connects the inner-cabin side wall 22 and the outer cabin side wall 23.

An inner lip 25 of which top end 25a side extends toward the connecting wall 24 side from the inner-cabin side wall 22 is formed on an outer-cabin side surface of a position on the inner-cabin side wall 22, which is on a connecting wall. 24 side compared with an end 22a. An inner surface of an end position 23a of the outer-cabin side wall 23, which is an inner-cabin side surface of the end position 23a of the outer-cabin side wall 23, has a forked outer lip 26 which extends toward an inner-cabin side. The inner lip 25 and the outer lip 26 are formed in such a manner as to fasten the door glass 9 respectively from the inner-cabin side and the outer-cabin side and are slidably brought into contact with both surfaces of the door glass 9.

The outer lip 26 is forked into an inner-attaching lip 26X and an outer-attaching lip 26Y. The inner-attaching lip 26X extends toward the connecting wall 24 side from an inner-cabin side surface of the end position 23a of said outer-cabin side wall 23 and faces said inner lip 25. The outer-attaching lip 26Y is substantially perpendicular to a direction in which the inner-attaching lip 26X extends from a base root 26d of the inner-attaching lip 26X and extends toward an opposite side to the connecting wall 24 side, A base root 26d of the inner-attaching lip 26X and the base root 26b of the outer-attaching lip 26Y are continuously formed.

The inner lip 25 is substantially S shaped in cross section so that an end surface 9a of the door glass 9 slidably moves from the base root 25b toward a top end 25a side of the inner lip 25 smoothly. In other words, one interval between the base root 25b and an intermediate part 25c of the inner lip 25 is swelled and curved to approach the inner-cabin side wall 22 side and another interval between the intermediate part 25c and the top end 25a of the inner lip 25 is swelled and curved to approach the outer-cabin side wall 23 side as an opposite side to the inner-cabin side wall 22. As a result, a surface on the door glass 9 side (surface on the opposite side to the connecting wall 24 side) of the interval between the base root 25b and the intermediate part 25c of the inner lip 25 forms a gentle concavely curved surface.

In order to prevent the top end 26a of the outer-attaching lip 26Y of the outer lip 26 from being drawn when guiding the door glass 9, before the door glass 9 is guided into the ditch 27 (FIG. 1), a displacement point 70 on the surface on the door glass 9 side (surface on the opposite side to the connecting wall 24 side) of the inner lip 25, on which a direction of a curve of the inner lip 25 changes from a direction to be swelled and curved to approach the inner-cabin side wall 22 side to a direction to be swelled and curved to approach the outer-cabin side wall 23, is on the connecting wall 24 side compared with a straight line 1000 which is perpendicular to the surface of the door glass 9 and descending from the top end 26a of the outer-attaching lip 26Y of the outer lip 26 to the inner-cabin side wall 22.

A concave is formed on a position 900 on the connecting wall 24 side of the base root 25b of the inner lip 25, more specifically on the position 900 on the connecting wall 24 side of the base root 25b of the inner lip 25 which intersects the outer-cabin side surface of the inner-cabin side wall 22, so that the inner lip 25 bends more easily. The position 900 is on the connecting wall 24 side compared with the straight line 1000 which is perpendicular to the surface of the door glass 9 and descending from the top end 26a of the outer-attaching lip 26Y of the outer lip 26 to the inner-cabin side wall 22.

The inner-cabin side wall 22 has lips 29a, 29b formed respectively on an inner-cabin side and an outer-cabin side thereof. The lip 29a extending toward the inner-cabin side from the inner-cabin side wall 22 is anchored by the protrusion 402a formed on an inner-cabin side 402 of the door sash 400. The lip 29b extending toward the outer-cabin side from the inner-cabin side wall 22 abuts the an inner-cabin side of the inner lip 25 which bends toward the inner-cabin side wall 22 side when slidably brought into contact with the door glass 9, thereby supporting the inner lip 25. An inner-cabin surface of the end 22a of the inner-cabin side wall 22 has a holding lip 29c formed thereon for inserting a pile of the inner-cabin side 402 of the door sash 400 and a door panel 200a between the holding lip 29c and the inner-cabin side wall 22. As a result, the glass run 20 which is fit, on the door sash 400 is held. Also, the inner-cabin side and the outer-cabin side of the inner-cabin side wall 22, the inner-cabin side and the outer-cabin side of the outer-cabin side wall 23, the outer-cabin side of the lip 29b and the outer-cabin side of the holding lip 29e have convexes and concaves 29d, 29e, 29f, 29g, 29h and 29i formed thereon for non-slippage.

As to the inner-attaching lip 26X side, the connecting wall 24 side of the base root 26d of the inner-attaching lip 26X has a folding point 60 formed thereon by providing a notch 28 from the inner-cabin side of the outer-cabin side wall 23, thereby forming thickness 32. The folding point 60 may also be formed only by thinning thickness, not by providing the notch.

The folding point 60 is formed on a position away from an end 401a of an outer-cabin side part 401 forming the door sash 400 toward a opposite side to the connecting wall 24 side (in FIG. 1, left side separate from the end 401a), which is on an extension line 40 of an inner-cabin side surface of the outer-cabin side part 401. In another word, for anchoring the end 23a side of the outer-cabin side wall 23 with the end 401a of the outer-cabin side part 401, the outer-cabin side wail 23 is bent toward the outer-cabin side relative to a direction in which the outer-cabin side wall 23 extends (front and rear direction of the automobile) and then bent toward the inner-cabin side, thereby providing the notch 28 on a part where bending direction is shifted and protrudingly providing the inner-attaching lip 26X from an inner-cabin side surface of the end 23a thereof.

Such a structure enables the inner-attaching lip 26X to turn smoothly toward the connecting wall 24 side around the folding point 60. Since the end 23a side of the outer-cabin side wall 23 is anchored with the end 401a of the outer-cabin side part 401, the inner-attaching lip 26X can stably turn.

Thickness 31 of the base root 26d of the inner-attaching lip 26X is thicker than the thickness 32 on the folding point 60.

In addition, an interval 50 between the outer-cabin side wall 23 and the outer-cabin side surface of the inner-attaching lip 26X which faces the outer-cabin side wall 23 is set to be wide for preventing the inner-attaching lip 26X from abutting the outer-cabin side wall 23 when the inner-attaching lip 26X is slidably brought into contact with the door glass 9.

As to the outer-attaching lip 26Y side, thickness 34 of the base root 26b of the outer-attaching lip 26Y is thinner than thickness 33 of the top end 26a of the outer-attaching lip 26Y. Thickness 34 of the base root 26b of the outer-attaching lip 26Y is formed by cutting off the inner-cabin side of the outer-attaching lip 26Y but may also be formed by forming the notch from the inner-cabin side. Also, the thickness 34 of the base root 26b of the outer-attaching lip 26Y may be formed by cutting off the outer-cabin side of the outer-attaching lip 26Y or by forming the notch from the outer-cabin side. Thickness of a center part of the outer-attaching lip 26Y is thicker than thickness 33 of the top end 26a.

As to the outer-attaching lip 26Y, before the door glass 9 is guided into the ditch, in a different manner from the inner-attaching lip 26X, the top end 26a does not abut the inner lip 25 and a space is provided between the top end 26a and the inner lip 25, via which the door glass is guided. The space is a movement distance 90 from an imaginary parallel line 600 on the top end 26a of the outer-attaching lip 26Y, the imaginary parallel line 600 being parallel with a surface of the door glass 9, to a position on which the imaginary parallel line 600 moved in parallel toward an inner-cabin side intersects the displacement point 70. The space having thickness of not less than a quarter of thickness 500 of the door glass 9 is acceptable. In the present embodiment, the space is wider than the thickness 500 of the door glass 9.

According to the present embodiment, the inner-attaching lip 26X has substantially the same length in cross section as the outer-attaching lip 26Y in cross section. In addition, thickness of the center part over the top end of the inner-attaching lip 26X is substantially the same as the thickness 34 of the base root 26b of the outer-attaching lip 26Y which is thinnest in the outer-attaching lip 26Y.

Examples of material of the body 21, the inner lip 25 and the outer lip 26 of the glass run 20 include EPDM rubber, olefinic thermoplastic elastomer and styrene-based thermoplastic elastomer but are not particularly limited. Products may be produced by construction of singular or plural of these materials. Also, the material may be foamed.

Next, a method of assembling the door glass on the glass run according to embodiments of the present invention will be described.

When inserting the door glass 9 into the ditch 27 of the glass run, as shown in FIG. 1, the door glass 9 is positioned on the inner-cabin side in a manner that the end surface 9a of the door glass 9 abuts the base root 25b of the inner lip 25 first.

Then, after the end surface 9a of the door glass 9 abuts the base root 25b of the inner lip 25, with insertion of the door glass 9, the door glass 9 slidably moves toward the top end 25a side from the base root 25b of the inner lip 25. More specifically, the door glass 9 is guided (inserted) into the ditch 27 of the glass run 20 by abuttingly arranging the end surface 9a of the door glass 9 along the concavely curved surface 25d of the inner lip 25 and then abuttingly moving the end surface 9a of the door glass 9 along the surface on the opposite side to the connecting wall 24 side of the inner lip 25 toward the top end 25a via the intermediate part 25c of the inner lip 25.

Figure 11:
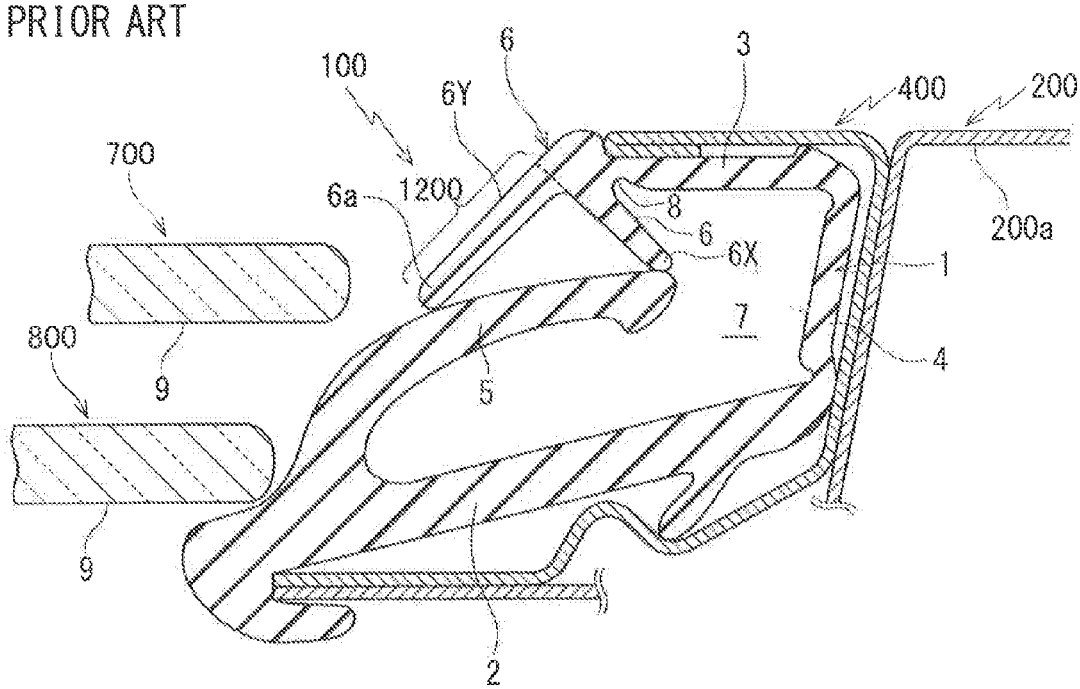
FIG. 11 is a I-I line enlarged cross section of FIG. 9, showing a state before the door glass is guided into the glass run of FIG. 10.
Figure 12:
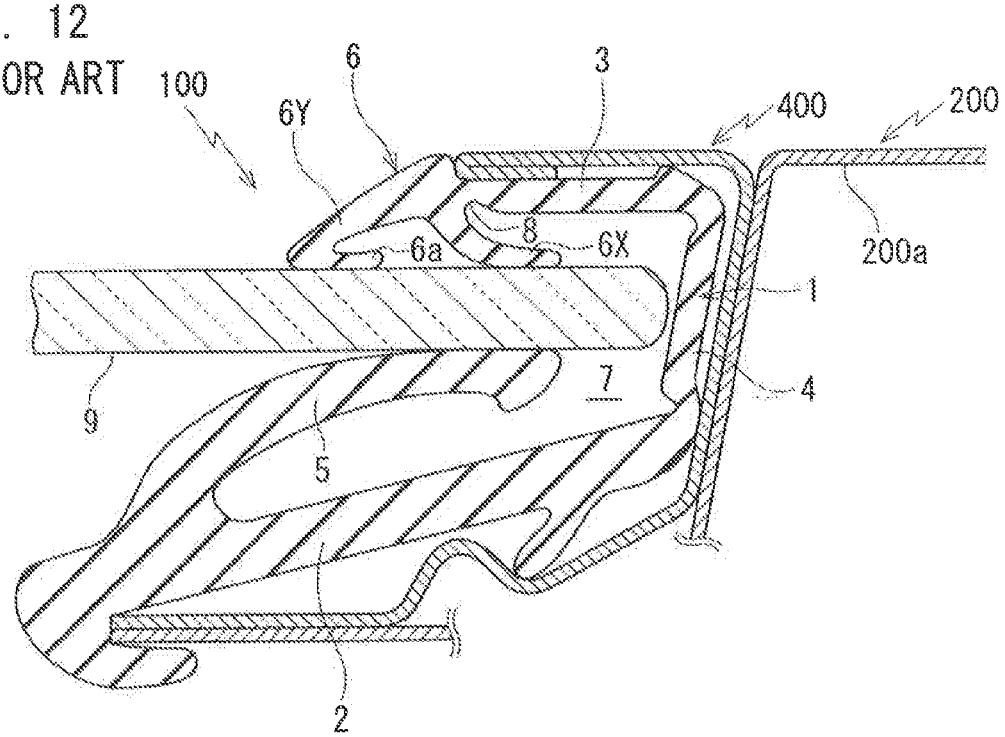
FIG. 12 is a I-I line enlarged cross section of FIG. 9, showing a state that an outer lip is drawn while guiding the door glass.

According to the structure, as shown in FIG. 2, the outer-cabin side surface of the door glass 9 abuts the inner-cabin side surface of the top end 26a of the outer-attaching lip 26Y first. The top end 25a of the inner lip 25 widely bends in a manner to approach the inner-cabin side wall 22 side from the connecting wall 24 side as the end surface 9a of the door glass 9 slidably moves on the inner lip 25. And the displacement point 70 on the surface on the door glass 9 side (surface on the opposite side to the connecting wail 24 side) of the inner lip 25, on which the direction of the curve of the inner lip 25 changes, is on the connecting wall 24 side compared with a top end 26a of the outer-attaching lip 26Y of the outer lip 26. Accordingly, when the end surface 9a of the door glass 9 which slidably moves on the inner lip 25 approaches the top end 26a of the outer-attaching lip 26Y, the outer-cabin side surface of the door class 9 abuts the inner-cabin side surface of the top end 26a of the outer-attaching lip 26Y without fail no matter how narrow the space between the top end. 26a of the outer-attaching lip 26Y and the inner lip 25 is. Such a structure prevents the top end 26a from being drawn toward the connecting wall 24 side as in the prior art (FIG. 11).

Figure 10:
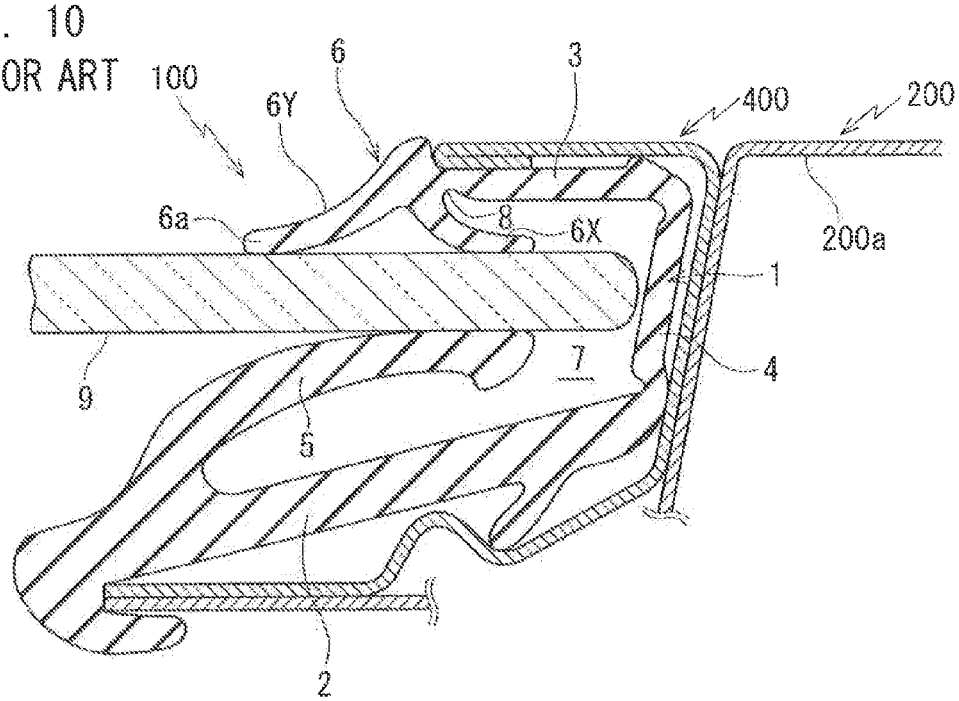
FIG. 10 is a I-I line enlarged cross section of FIG. 9, showing a state after a door glass is guided into the glass run of a prior art.

As the end surface 9a of the door glass 9 slidably moves on the inner lip 25, the top end 25a of the inner lip 25 bends in the manner to approach the inner-cabin side wall 22 side from the connecting wall 24 side. Degree of bending becomes greater as the end surface 9a of the door glass 9 approaches the displacement point 70 on which the direction of the curve changes. Since the displacement point 70 of the inner lip 25 of the present embodiment is on a substantial center in length, the inner lip 25 easily bends when inserting the door glass 9 for assembly and performs holding force of the door glass 9 to be described later. Also, the concave is formed on a position 900 on the connecting wall 24 side of the base root 25b of the inner lip 25, more specifically the position 900 on the connecting wall 24 side of the base root 25b of the inner lip 25 intersecting the outer-cabin side surface of the inner-cabin side wall 22. The position 900 is on the connecting wall 24 side compared with the straight line 1000 which is perpendicular to the surface of the door glass 9 and descending from the top end 26a of the outer-attaching lip 26Y of the outer lip 26 to the inner-cabin side wall 22. As a result, the inner lip 25 bends more easily. In the present embodiment, since the top end 26a of the outer-attaching lip 26Y is formed at a distance from the inner lip 25 with a space therebetween, the outer-cabin side surface of the door glass 9 does not touch the inner-cabin side surface of the top end 26a of the outer-attaching lip 26Y or even in case the outer-cabin side surface of the door glass 9 touches the inner-cabin side surface of the top end 26a, the top end 26a of the outer-attaching lip 26Y is not drawn toward the connecting wall 24 side by the door glass 9. Even in case the top end 26a of the outer-attaching lip 26Y abuts the inner lip 25 as in the prior art (FIG. 10), since the top end 25a of the inner lip 25 widely bends in a manner to approach the inner-cabin side wall 22 side from the connecting wall 24 side as the end surface 9a of the door glass 9 slidably moves on the inner lip 25, and the displacement point 70 on the surface on the door glass 9 side of the inner lip 25, on which a direction of the curve of the inner lip 25 changes, is on the connecting wall 24 side compared with the top end 26a of the outer-attaching lip 26Y of the outer lip 26, it is hardly possible that the top end 26a of the outer-attaching lip 26Y is drawn toward the connecting wall 24 side.

Also, the door glass 9 abuts the inner-cabin side surface of the outer-attaching lip 26Y of the outer lip 26 substantially at the right angle. More specifically; the end surface 9a of the door glass 9 gradually approaches and abuts the outer-attaching lip 26Y of the outer lip 26 by slidably moving on the interval between the base root 25b and the displacement point 70 on the intermediate part 25c of the inner lip 25, swelled and curved toward the inner-cabin side wall 22 side. In other words, the door glass 9 abuts the inner-cabin side surface of the outer-attaching lip 26Y of the outer lip 26 from an obtuse direction compared with the ordinary inner lip 5 of the prior art (FIG. 10), which as a whole is swelled and curved toward the outer-cabin side wall 3 side from the inner-cabin side wall 2 in cross section. Such a structure further prevents the top end 26a of the outer-attaching lip 26Y of the outer lip 26 from being drawn toward the connecting wall 24 side.

In addition, since the concavely curved surface 25d is formed on the base root 25b for forming the inner lip 25 into a substantially S shape in cross section, the door glass 9 slidably moves on the inner lip 25 smoothly. Such a structure does not cause a problem that the base root 25b of the inner lip 25 catches the door glass 9.

The space is provided between the top end 26a of the outer-attaching lip 26Y and the displacement point 70 on the inner lip 25. The space is the movement distance 90 from an imaginary parallel line 600 on the top end 26a of the outer-attaching lip 26Y, the imaginary parallel line 600 being parallel with a surface of the door glass 9, to the position on which the imaginary parallel line 600 moved in parallel toward the inner-cabin side intersects the displacement point 70. The space having thickness of not less than a quarter of thickness 500 of the door glass 9 is acceptable. In the present embodiment, the space is wider than the thickness 500 of the door glass 9.

As the door glass 9 is further guided into the ditch 27, the door glass 9 abuts an inner-cabin aide surface of the inner-attaching lip 26X. In this state, the outer-cabin side surface of the door glass 9 abuts the inner-attaching lip 26X and the outer-attaching lip 26Y.

As the door glass 9 is still further guided into the ditch 27, the door glass 9 is slidably brought into contact with the inner-attaching lip 26X, force acts on the top end 26a of the outer-attaching lip 26Y over the base root 26d side, the inner-attaching lip 26X turns toward connecting wall 24 side around the folding point 60, which is in a counterclockwise direction in FIG. 1, and touching area of the inner-attaching lip 26X relative to the door glass 9 increases. Since the base root 26d of the inner-attaching lip 26X and the base root 26b of the outer-attaching lip 26Y are continuously formed, when the inner-attaching lip 26X turns, the outer-attaching lip 26Y also turns following movement of the inner-attaching lip 26X in such a manner as to approach the door glass 9 side and is slidably brought into contact with the door glass 9. In this state, since the outer-attaching lip 26Y abuts the door glass 9 even before the inner-attaching lip 26X turns, force acts on the outer-attaching lip 26Y to turn toward connecting wall 24 side around the folding point 60, which is in a counterclockwise direction in FIG. 1, and the force is also transmitted to the door glass 9. As a result, load on the door glass 9 from the inner-attaching lip 26X and the outer-attaching lip 26Y is already larger when the door glass 9 abuts the inner-attaching lip 26X for the first time.

As the door glass 9 is still further guided into the ditch 27, since the outer-attaching lip 26Y is thinned in thickness on the base root 26b side, the top end 26a of the outer-attaching lip 26Y bends and moves toward an opposite side to the connecting wall 24, side (left side in FIG. 1) along the door glass 9.

The inner lip 25 abuts the inner-cabin side surface of the door glass 9 so that the door glass 9 is held between the inner lip 25 and the outer lip 26. In this state, the interval between the intermediate part 25c and the top end 25a of the inner lip 25 is swelled and curved toward the outer-cabin side wall 23 side, which is opposite in curving direction to the interval between the base root 25b and the intermediate part 25c of the inner lip 25. Accordingly, the door glass 9 is subjected to greater reaction force by elastic deformation of the interval between the intermediate part 25c and the top end 25a of the inner lip 25 compared with the ordinary inner lip 5 of the prior art (FIG. 10) which as a whole is swelled and curved toward the outer-cabin side wall 3 side from the inner-cabin side wall 2 in cross section. As a result, the door glass 9 is held between the inner lip 25 and the outer lip 26 more securely and stably compared with the prior art.

According to the above-structured glass run 20 of the present embodiment, when the door glass 9 is guided (inserted) into the ditch 27 of the glass run 20 for closing the door glass 9, it is hardly possible that the top end 26a of the outer-attaching lip 26Y is drawn toward the connecting wall 24 side. Accordingly sufficient sealing property is secured by lengthening length of the outer-attaching lip 26Y in cross section.

In the present embodiment, the outer-attaching lip 26Y and the inner-attaching lip 26X are of the same length in cross section but even the outer-attaching lip 26Y longer in length than the inner-attaching lip 26X in cross section is not drawn toward the connecting wall 24 side, thereby performing an excellent noise insulation function and water proof function.

In addition, the door glass 9 slidably moves on the inner lip 25 smoothly. Accordingly, insertion property of the door glass 9 relative to the glass run 20 is improved. Therefore, it is not necessary to partially cut off the top end side of the outer-attaching lip 26Y below the position of the belt line 80 as in the prior art, thereby improving the productivity. Even in case the top end side of the outer-attaching lip 26Y is not partially cut off, it is not necessary to use the jig exclusively for inserting the door glasses in the assembly line. Such a structure does not take an extra manufacturing time, thereby improving assembly workability.

The thickness 31 of the base root 26*d* of the inner-attaching lip 26X to which the base root 26*b* of the outer-attaching lip 26Y is continuously formed is thicker than the thickness 32 on the folding point 60. Accordingly, the outer-attaching lip 26Y well follows the turn of the inner-attaching lip 26X, and the inner-attaching lip 26X and the outer-attaching lip 26Y integrally turn.

Accordingly, when the door glass 9 is closed, as soon as the door glass 9 abuts the inner-attaching lip 26X, the inner-attaching lip 26X and the outer-attaching lip 26Y integrally begin to turn. And, as the door glass 9 is subject to load from the inner-attaching lip 26X and the outer-attaching lip 26Y soon after beginning to close the door glass 9, fluttering of the door glass 9 is solved at an early stage.

In addition, since the thickness 34 of the base root 26*b* of the outer-attaching lip 26Y is thinner than thickness 33 of the top end 26*a*, after the inner-attaching lip 26X and the outer-attaching lip 26Y integrally turn relative to the door glass 9, the top end 26*a* of the outer-attaching lip 26Y bends and moves toward the opposite side to the connecting wall 24 side along the door glass 9.

According to the present invention, the folding point 60 is formed on a position away from an end 401*a* of the outer-cabin side part 401 toward an opposite side to the connecting wall 24 side, which is on the extension line 1100 of the inner-cabin side surface of the outer-cabin side part 401. As a result, length of the inner-attaching lip 26X and the outer-attaching lip 26Y can be lengthened in cross section, thereby increasing bending amount, compared with a prior art of which a part corresponding to the folding point (notch 8) is formed on an inner side of the outer-cabin side part 401.

Since the inner-attaching lip 26X is lengthened in cross section, the inner-attaching lip 26X is prevented from abutting the inner-cabin side of the end 23*a* of the outer-cabin side wall 23 when bending.

According to the structure, since the door glass 9 is subject to substantially stable load from the inner-attaching lip 26X and the outer-attaching lip 26Y when closing the door glass 9, the door glass 9 is stably held.

In the present embodiment, the folding point 60 on which the inner-attaching lip 26X turns toward the connecting wall 24 side is formed on the extension line 1100 of the inner-cabin side surface of the outer-cabin side part 401 of the door sash 400. But the folding point 60 may also be formed on the outer-cabin side compared with the extension line 1100 of the inner-cabin side surface of the outer-cabin side part 401 of the door sash 400 by extensively curving the end 23*a* of the outer-cabin side wall 23. Such a structure lengthens length of the inner-attaching lip 26X and the outer-attaching lip 26Y in cross section, thereby increasing bending amount. Such a structure also prevents the inner-attaching lip 26X from abutting the inner-cabin side of the end 23*a* of the outer-cabin side wall 23 when the inner-attaching lip 26X bends.

Alternatively, even in case the fording point 60 is formed on an ordinary position according to the prior art (FIG. 11), when the door glass 9 is guided (inserted) into the ditch 27 of the glass run 20, it is hardly possible that the top end 26*a* of the outer-attaching lip 26Y is drawn toward the connecting wall 24 side. Also, insertion property of the door glass 9 relative to the glass run 20 is improved.

Figure 4:
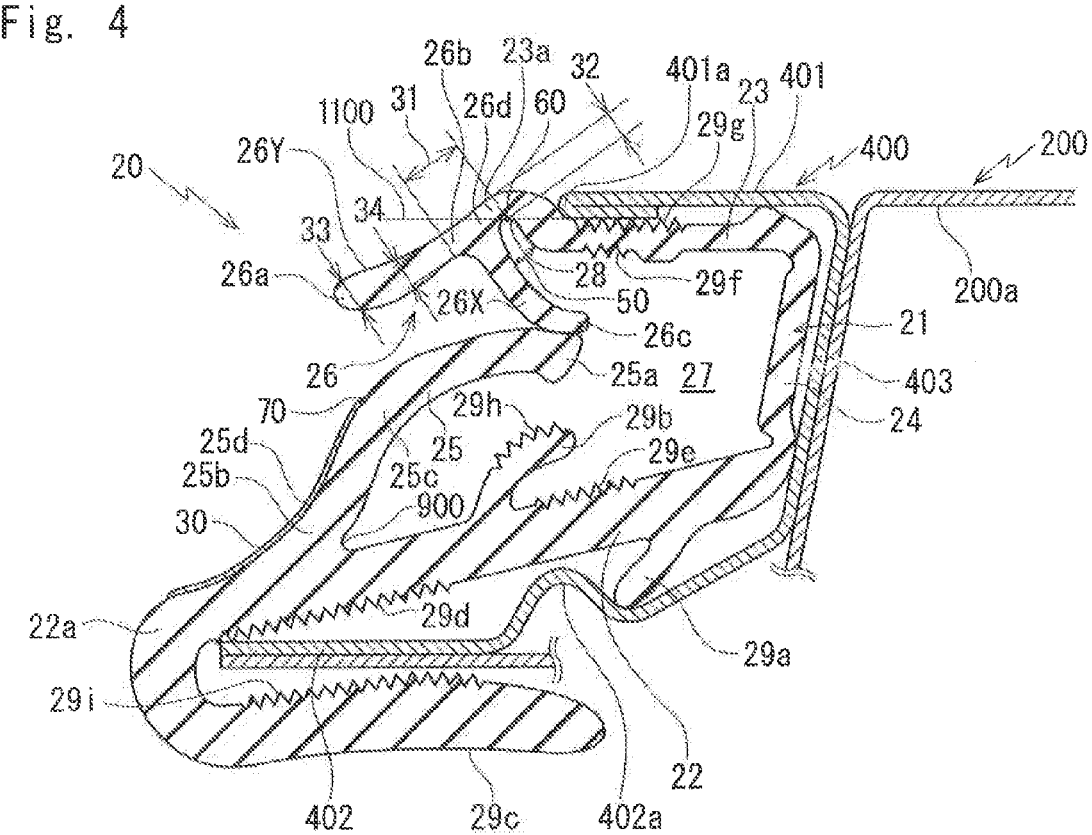
FIG. 4 is a I-I line enlarged cross section of FIG. 9, showing a state before a door glass is guided into a glass run according to another embodiment of the present invention.
Figure 5:
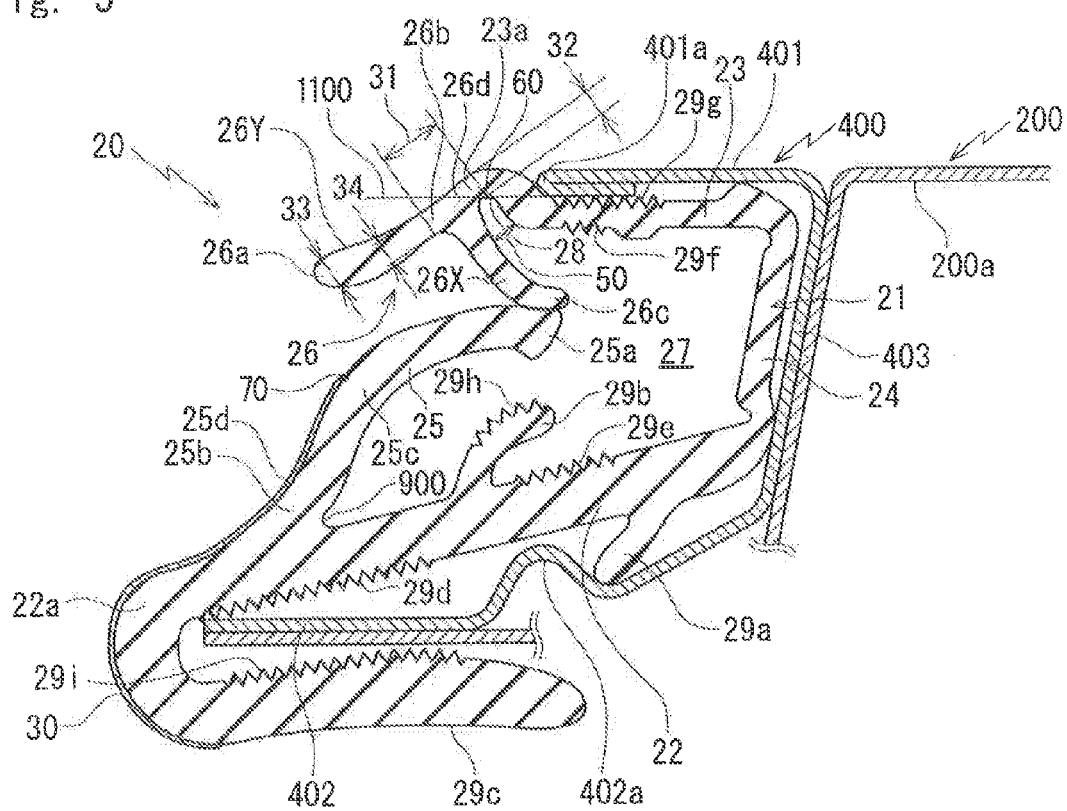
FIG. 5 is a I-I line enlarged cross section of FIG. 9, showing a state before a door glass is guided into a glass run according to still another embodiment of the present invention.
Figure 6:
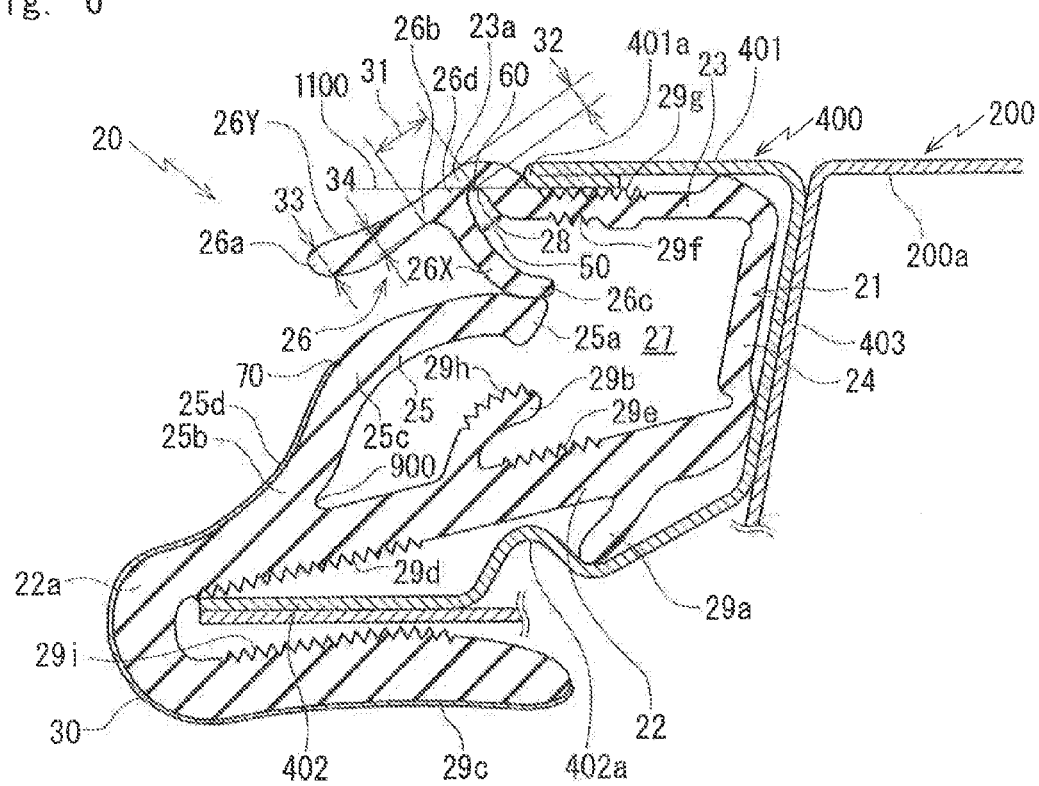
FIG. 6 is a I-I line enlarged cross section of FIG. 9, showing a state before a door glass is guided into a glass run according to still another embodiment of the present invention.

In the embodiment of the present invention, the door glass 9 slidably moves on the inner lip 25 smoothly without getting caught by defining a cross sectional shape of the inner lip 25. But, as shown in FIG. 4 to FIG. 6, slidable material 30 may be provided on a surface on an opposite side to the connecting wall 24 side of the base root 25*b* of the inner lip 25 by adherence or coating for further smoothening slidable movement of the door glass 9. The slidable material 30 may be adhered simultaneously with extrusion molding of the glass run 20 body or a separate slidable material 30 may be adhered later.

In FIG. 4, the slidable material 30 is provided only within a range from the displacement point 70 on the door glass 9 side of the inner lip 25, on which the direction of the curve changes, to an upper surface of the concavely curved surface 25*d* on the base root 25*b* of the inner lip 25. In FIG. 5, the slidable material 30 of FIG. 4 is extended to cover the end 22*a* side of the inner-cabin side wall 22 from an outer side for preventing the glass run 20 from coming off in case passengers touch the glass run 20 when getting on or getting off the automobiles for the effect of a smooth surface of the slidable material 30. In FIG. 6, the slidable material 30 of FIG. 5 is further extended to cover the top end of the holding lip 29*c* for improving design of the inner lip 25.

Figure 7:
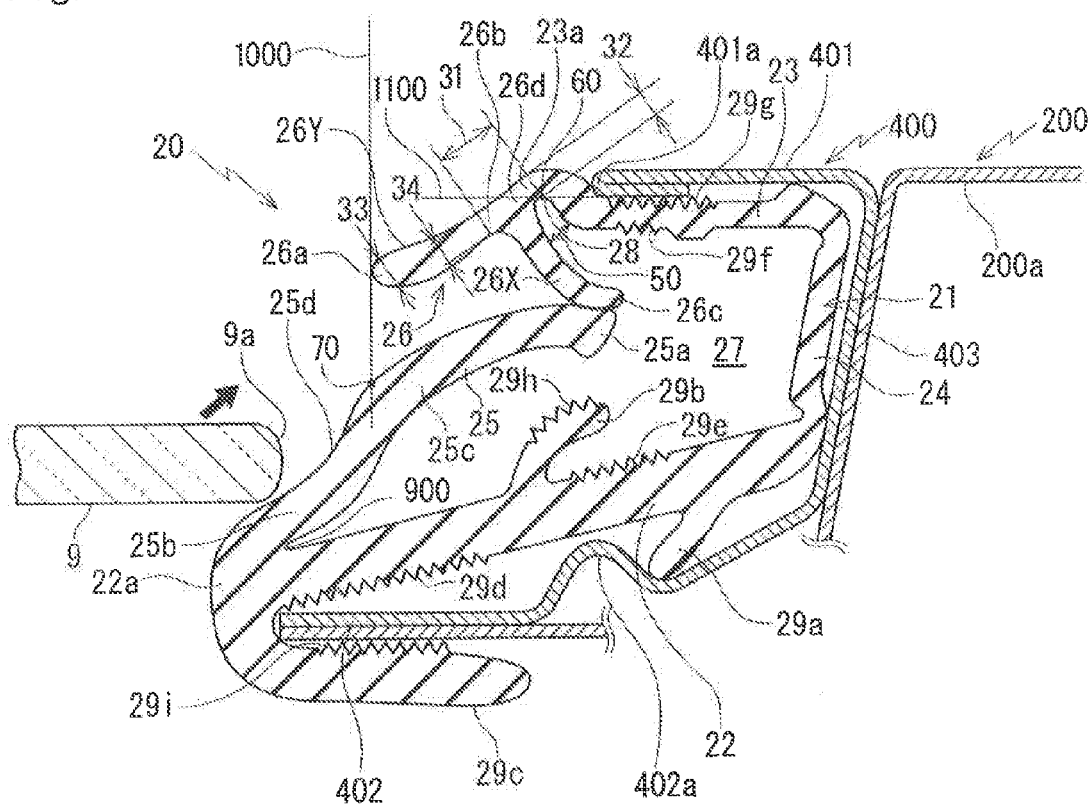
FIG. 7 is a I-I line enlarged cross section of FIG. 9, showing a state before a door glass is guided into a glass run according to still another embodiment of the present invention.
Figure 8:
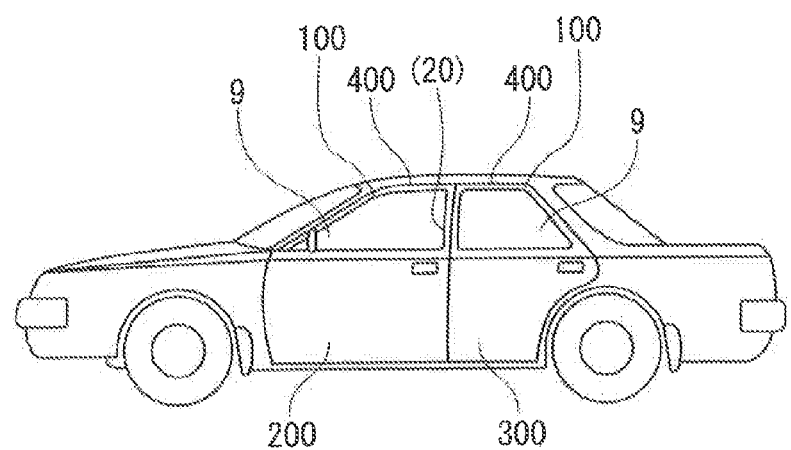
FIG. 8 is a lateral view of an automobile.

In the embodiment of the present invention, in order to prevent the top end 26*a* of the outer-attaching lip 26Y of the outer lip 26 from being drawn while guiding the door glass 9, before the door glass 9 is guided into the ditch 27 (FIG. 1), the displacement point 70 on the surface on the door glass 9 side (surface on the opposite side to the connecting wall 24 side) of the inner lip 25, on which a direction of a curve of the inner lip 25 changes, is on the connecting wall 24 side compared with a straight line 1000 which is perpendicular to the surface of the door glass 9 and descending from the top end 26*a* of the outer-attaching lip 26Y of the outer lip 26 to the inner-cabin side wall 22. But, as shown in FIG. 7, before the door glass 9 is guided into the ditch 27 (FIG. 1), the displacement point 70 on the surface on the door glass 9 side (surface on the opposite side to the connecting wall 24 side) of the inner lip 25, on which the direction of the curve of the inner lip 25 changes, may also be on the same position as the straight line 1000 which is perpendicular to the surface of the door glass 9 and descending from the top end 26*a* of the outer-attaching lip 26Y of the outer lip 26 to the inner-cabin side wail 22. Alternatively, the displacement point 70 may be on the opposite side (left side in FIG. 7) to the connecting wall 24 side compared with the straight line 1000. In this case, while inserting the door glass 9 into the ditch 27 of the glass run 20 for assembling the door glass 9, as the end surface 9*a* of the door glass 9 slidably moves toward the top end 25*a* side from the base root 25*b* of the inner lip 25 and just before the door glass 9 abuts the outer-attaching lip 26Y of the outer lip 26, the displacement point 70 has to be on the connecting wall 24 side compared with the top end 26*a* of the outer-attaching lip 26Y of the outer lip 26 in consideration of bending amount.

In the embodiment of the present invention, as shown in FIG. 1, the inner lip 25 extends from the outer-cabin side surface of the position on the connecting wall 24 side compared with the end 22*a* of the inner-cabin side wall 22. But, as shown in FIG. 7, the inner lip 25 may directly extend from the outer-cabin side surface of the end 22*a* of the inner-cabin side wall 22.

In this case, the door glass 9 is inserted into the ditch 27 of the glass run 20 by abutting the end surface 9*a* of the door glass 9 on the base root 25*b* of the inner lip 25 first and slidably moving the door glass 9 toward the top end 25*a* side from the base root 25*b* of the inner lip 25.

In the embodiment of the present invention, as shown in FIG. 1, the concave is formed on the position 900 on the connecting wall 24 side of the base root 25b of the inner lip 25 so that the inner lip 25 bends more easily. But, as shown in FIG. 7, formation of the concave may be omitted on the position 900 on the connecting wall. 24 side.

I claim:

1. A glass run of an automobile door, for guiding a door glass in a frame having a substantially U-shaped cross section, the glass run comprising:
   a body having a substantially U-shaped cross-section including an inner-cabin side wall, an outer-cabin side wall and a connecting wall which connects the side walls and forms a channel;
   an inner lip which extends toward a connecting wall side from an outer-cabin side surface of said inner-cabin side wall and is slidably brought into contact with said door glass; and
   an outer lip which extends toward an inner-cabin side from an inner side surface of an end position of said outer-cabin side wall and is slidably brought into contact with said door glass,
   the outer lip being forked into:
      an inner-attaching lip which extends toward said connecting wall side from an inner-cabin side surface of the end position of said outer-cabin side wall and which faces said inner lip; and
      an outer-attaching lip which is substantially perpendicular to a direction in which the inner-attaching lip extends from a base root of the inner-attaching lip and which extends toward an opposite direction from said connecting wall side; wherein:
   said inner lip substantially has an S shaped cross section, wherein a first portion between a base root of said inner lip and an intermediate part of said inner lip has a convex shape toward said inner-cabin side wall side and a second portion between the intermediate part and a top end of said inner lip has a convex shape toward said outer-cabin side wall side;
   an inflection point of the S shaped inner lip, on which a direction of a curve of said inner lip changes, is closer to said connecting wall than a top end of the outer-attaching lip of said outer lip; and
   the base root of the inner lip has a connecting wall side surface which is closer to the connecting wall than the top end of the outer-attaching lip.

2. The glass run as claimed in claim 1, wherein:
   a distance between the top end of the outer-attaching lip and the inflection point is not less than a quarter of a thickness of said door glass, wherein the distance between the top end of the outer-attaching lip and the inflection point is a distance between the top end of the outer-attaching lip and an inner-cabin side part of the frame, minus a distance between the inflection point and the inner-cabin side part of the frame minus (a distance between the inflection point and the inner-cabin side part of the frame).

3. The glass run as claimed in claim 2, wherein:
   a slidable material is provided on a surface on an opposite side to said connecting wall side of the base root of said inner lip.

4. The glass run as claimed in claim 3, wherein:
   a folding point is formed by thinning thickness of said connecting wall side of the base root of said inner-attaching lip or by forming a notch from an inner-cabin side for turning said inner-attaching lip toward said connecting wall side;
   a thickness of the base root of said inner-attaching lip is thicker than the thickness on said folding point and thickness of a base root of said outer-attaching lip is thinner than a thickness of the top end of the outer-attaching lip; and
   when said door glass is guided into said ditch and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

5. The glass run as claimed in claim 2, wherein:
   a folding point is formed by thinning thickness of said connecting wall side of the base root of said inner-attaching lip or by forming a notch from an inner-cabin side for turning said inner-attaching lip toward said connecting wall side;
   a thickness of the base root of said inner-attaching lip is thicker than the thickness on said folding point and thickness of a base root of said outer-attaching lip is thinner than a thickness of the top end of the outer-attaching lip; and
   when said door glass is guided into said ditch and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

6. The glass run as claimed in claim 1, wherein:
   a slidable material is provided on a surface on an opposite side to said connecting wall side of the base root of said inner lip.

7. The glass run as claimed in claim 6, wherein:
   a folding point is formed by thinning thickness of said connecting wall side of the base root of said inner-attaching lip or by forming a notch from an inner-cabin side for turning said inner-attaching lip toward said connecting wall side;
   a thickness of the base root of said inner-attaching lip is thicker than the thickness on said folding point and thickness of a base root of said outer-attaching lip is thinner than a thickness of the top end of the outer-attaching lip; and
   when said door glass is guided into said ditch and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

8. The glass run as claimed in claim 1, wherein:
   a folding point is formed by thinning thickness of said connecting wall side of the base root of said inner-attaching lip or by forming a notch from an inner-cabin side for turning said inner-attaching lip toward said connecting wall side;
   a thickness of the base root of said inner-attaching lip is thicker than the thickness on said folding point and thickness of a base root of said outer-attaching lip is thinner than a thickness of the top end of the outer-attaching lip; and when said door glass is guided into said ditch and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

9. The glass run as claimed in claim 1 wherein:
a top end of the inter-attaching lip is closer to the connecting wall than the connecting wall side surface of the base root of the inner lip.

10. A glass run of an automobile door, for guiding a door glass in a frame having a substantially U-shaped cross section, the glass run comprising:
a body having a substantially U-shaped cross-section including an inner-cabin side wall, an outer-cabin side wall and a connecting wall which connects the side walls and forms a channel;
an inner lip which extends toward a connecting wall side from an outer-cabin side surface of said inner-cabin side wall and is slidably brought into contact with said door glass; and
an outer lip which extends toward an inner-cabin side from an inner side surface of an end position of said outer-cabin side wall and is slidably brought into contact with said door glass,
the outer lip being forked into:
an inner-attaching lip which extends toward said connecting wall side from an inner-cabin side surface of the end position of said outer-cabin side wall and which faces said inner lip; and
an outer-attaching lip which is substantially perpendicular to a direction in which the inner-attaching lip extends from a base root of the inner-attaching lip and which extends toward an opposite direction from said connecting wall side; wherein:
said inner lip substantially has an S shaped cross section, wherein a first portion between a base root of said inner lip and an intermediate part of said inner lip has a convex shape toward said inner-cabin side wall side and a second portion between the intermediate part and a top end of said inner lip has a convex shape toward said outer-cabin side wall side;
when said door glass is inserted into the channel after an end surface of said door glass is slidably moved toward a top end side of said inner lip from the base root of said inner lip and just before said door glass abuts the outer-attaching lip of said outer lip, an inflection point of the S shaped inner lip, on which a direction of a curve of said inner lip changes, is closer to said connecting wall than a top end of the outer-attaching lip of said outer lip; and
the base root of the inner lip has a connecting wall side surface which is closer to the connecting wall than the top end of the outer-attaching lip.

11. The glass run as claimed in claim 10, wherein:
a distance between the top end of the outer-attaching lip and the inflection point is not less than a quarter of a thickness of said door glass, wherein the distance between the top end of the outer-attaching lip and the inflection point is a distance between the top end of the outer-attaching lip and an inner-cabin side part of the frame, minus a distance between the inflection point and the inner-cabin side part of the frame minus (a distance between the inflection point and the inner-cabin side part of the frame).

12. The glass run as claimed in claim 11, wherein:
a slidable material is provided on a surface on an opposite side to said connecting wall side of the base root of said inner lip.

13. The glass run as claimed in claim 12, wherein:
a folding point is formed by thinning thickness of said connecting wall side of the base root of said inner-attaching lip or by forming a notch from an inner-cabin side for turning said inner-attaching lip toward said connecting wall side;
a thickness of the base root of said inner-attaching lip is thicker than the thickness on said folding point and thickness of a base root of said outer-attaching lip is thinner than a thickness of the top end of the outer-attaching lip; and
when said door glass is guided into said ditch and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

14. The glass run as claimed in claim 11, wherein:
a folding point is formed by thinning thickness of said connecting wall side of the base root of said inner-attaching lip or by forming a notch from an inner-cabin side for turning said inner-attaching lip toward said connecting wall side;
a thickness of the base root of said inner-attaching lip is thicker than the thickness on said folding point and thickness of a base root of said outer-attaching lip is thinner than a thickness of the top end of the outer-attaching lip; and
when said door glass is guided into said ditch and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

15. The glass run as claimed in claim 10, wherein:
a slidable material is provided on a surface on an opposite side to said connecting wall side of the base root of said inner lip.

16. The glass run as claimed in claim 15, wherein:
a folding point is formed by thinning thickness of said connecting wall side of the base root of said inner-attaching lip or by forming a notch from an inner-cabin side for turning said inner-attaching lip toward said connecting wall side;
a thickness of the base root of said inner-attaching lip is thicker than the thickness on said folding point and thickness of a base root of said outer-attaching lip is thinner than a thickness of the top end of the outer-attaching lip; and
when said door glass is guided into said ditch and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

17. The glass run as claimed in claim 10, wherein:
a folding point is formed by thinning thickness of said connecting wall side of the base root of said inner-attaching lip or by forming a notch from an inner-cabin side for turning said inner-attaching lip toward said connecting wall side;
a thickness of the base root of said inner-attaching lip is thicker than the thickness on said folding point and thickness of a base root of said outer-attaching lip is thinner than a thickness of the top end of the outer-attaching lip; and
when said door glass is guided into said ditch and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

18. A method of assembling a door glass on A glass run of an automobile door, for guiding a door glass in a frame having a substantially U-shaped cross section, the glass run comprising:
a body having a substantially U-shaped cross-section including an inner-cabin side wall, an outer-cabin side wall and a connecting wall which connects the side walls and forms a channel;
an inner lip which extends toward a connecting wall side from an outer-cabin side surface of said inner-cabin side wall and is slidably brought into contact with said door glass; and
an outer lip which extends toward an inner-cabin side from an inner side surface of an end position of said outer-cabin side wall and is slidably brought into contact with said door glass,
the outer lip being forked into:
an inner-attaching lip which extends toward said connecting wall side from an inner-cabin side surface of the end position of said outer-cabin side wall and which faces said inner lip; and
an outer-attaching lip which is substantially perpendicular to a direction in which the inner-attaching lip extends from a base root of the inner-attaching lip and which extends toward an opposite side to said connecting wall side;
said inner lip substantially has an S shaped cross section, wherein a first portion between a base root of said inner lip and an intermediate part of said inner lip has a convex shape toward said inner-cabin side wall side and a second portion between the intermediate part and a top end of said inner lip has a convex shape toward said outer-cabin side wall side;
an inflection point of the S shaped inner lip, on which a direction of a curve of said inner lip changes, is closer to said connecting wall than a top end of the outer-attaching lip of said outer lip; wherein
said door glass is inserted into the channel by abutting an end surface of said door glass on the base root of said inner lip first, abutting an outer-cabin side surface of said door glass on an inner-cabin side surface of the inner-attaching lip of said outer lip via an inner-cabin side surface of the outer-attaching lip of said outer lip and abutting an inner-cabin side surface of said door glass on said inner lip while slidably moving said door glass toward the top end side of said inner lip from the base root of said inner lip for holding said door glass; and
the base root of the inner lip has a connecting wall side surface which is closer to the connecting wall than the top end of the outer-attaching lip.

* * * * *